Patented July 15, 1952

2,603,618

UNITED STATES PATENT OFFICE 2,603,618

STYRENE LACQUER FOR DECALCOMANIA PRODUCED FROM THE SAME

Bernard J. Cagan, Los Angeles, Walter Burroughs, Costa Mesa, and Robert Silverstein, Beverly Hills, Calif., assignors to Plastic & Diecast Products Corp., Los Angeles, Calif., a corporation of California No Drawing. Application May 1, 1947, Serial No. 745,254

2 Claims. (Cl. 260—31.4)

1

This invention relates to a styrene lacquer and to a decalcomania produced from said lacquer.

Heretofore, it has not been possible to effect a satisfactory transfer of a decalcomania onto a styrene surface. The ordinary decalcomanias consist of a paper on which is printed a suitable design and an adhesive coating. The adhesive coating is utilized for causing the design to adhere to an object to which the decalcomania is to be attached, the paper upon which the design has been printed being washed or stripped off at the end of the transferring operation. When such decalcomanias are applied to a styrene surface, the design adheres very poorly to the surface.

It is an object of the present invention to provide a decalcomania suitable for use on a styrene surface.

A further object of the present invention is to provide a decalcomania which, in place of relying upon an adhesive for causing the design to adhere to the surface to which it is to be applied, is constructed so that the design may be readily caused to adhere to a styrene surface by an incipient fusion. By means of the present invention, decalcomanias are provided, which may be readily transferred to styrene surfaces by the application of heat resulting in a fusion between the design and the surface, so that the design becomes permanently attached thereto.

The present invention is predicated upon the discovery that, by forming the decalcomanias out of a styrene plastic lacquer, the resulting decalcomanias may be readily transferred to a styrene surface by an incipient fusion operation. In this manner, the design of the decalcomania becomes intimately bonded with the styrene surface. The styrene lacquers which have, heretofore, been produced have been unsuitable for the production of decalcomanias. Solutions of styrene plastics containing appreciable quantities of the plastic in solution are generally viscous and stringy. If attempts are made to utilize such lacquers for the production of decalcomanias, difficulty is experienced from the formation of bubbles at the pores of the silk screen. Another difficulty with the styrene lacquers heretofore employed is that they evaporate too rapidly, when attempts are made to produce decalcomanias therefrom, with the result that clogging of the screen occurs.

It is a further object of the present invention to provide a styrene lacquer, which is suitable for the production of decalcomanias utilizing a silk screen process.

2

Common styrene plastics, such, for example, as have a molecular weight of the order of 60,000 or higher, when dissolved in a solvent, even to form a solution containing as low as 9 to 10% of the styrene plastic produce lacquers which are too viscous and stringy to permit of printing decalcomanias by the silk screen process. We have found, however, that by utilization of styrene plastics of low molecular weight, such as, for example, ranging from 5,000 to 20,000 in molecular weight, lacquers may be produced containing as much as 50% of the plastic, which lacquers are satisfactory for the production of decalcomanias. By the addition of suitable paint pigments, decalcomanias may be readily formed, using lacquers of this type, by the silk screen process. These decalcomanias do not require the addition of an adhesive for transfer purposes, but may be readily transferred to a styrene surface by the application of low temperatures (around 200 to 250° F.)

The invention includes the further discovery that the problem of clogging of the screen during printing of the decalcomania may be cured by the proper selection of solvents. By the use of solvents having low vapor pressures, such as the order of 0.2 to 0.6 mm. at normal temperatures, the evaporation rate of the solvent may be regulated to permit ready production of the decalcomania design. Preferably, in accordance with the present invention, there is employed a plurality of solvents, each having low vapor pressures, but having different vapor pressures. By the use of two different solvents, having different vapor pressures, a superior evaporating property of the lacquer is achieved; the solvents, to a substantial extent, evaporating successively, the more volatile evaporating first and the less volatile, last. It is to be understood, however, that the use of such solvents are not essential to all forms of the invention, as other solvents, including those having higher vapor pressures, may be substituted therefor, although the difficulty of producing proper decalcomanias therefrom will be increased.

The styrene lacquers and decalcomanias produced therefrom, of the present invention, will be more completely understood from the following preferred examples of the invention. To 255 parts, by weight, of a styrene plastic of a molecular weight of about 18,000, is added 45 parts, by weight, of a plasticizer. Any usual plasticizer, compatible with a styrene plastic may be used. In the particular example, however, butyl phthalyl butyl glycollate was used. Solvents employed were isophorone, 300 parts by weight, and diethylene glycol monobutyl ether acetate, 150 parts by weight. Isophorone has a vapor pressure of 0.6 mm. at 20° C. and diethylene glycol monobutyl ether acetate has a vapor pressure of 0.2 mm. at 20° C.

The lacquer resulting is a clear lacquer, sufficiently low in viscosity and non-stringy, to be readily employed in a silk screen process of producing decalcomanias. The two different solvents employed provide the lacquer with a proper evaporation rate, without danger of clogging. Moreover, the more volatile solvent evaporates rapidly.

In producing decalcomanias from this lacquer, the lacquer is first pigmented in a paint mill, in order to incorporate the desired color. Any usual paint pigments may be used, depending on the particular color desired in the decalcomania. For example, we have used chrome yellow, toluidine red, and titanium dioxide for white.

In producing the decalcomania through the use of the lacquer, the desired design is printed, preferably through the use of a silk screen process, onto a suitable paper. Where designs containing a variety of colors are desired, these different colors are produced in the usual manner, by successive printings with lacquers containing different paint pigments. The matter of color intensity and gloss of the transferred decalcomanias can be controlled by the number and types of coats of lacquer with which the decalcomania is made.

The decalcomanias of the present invention thus consist of a design formed of a styrene plastic and paint pigments printed upon a suitable transfer paper. It is not necessary, in accordance with the present invention, to add any adhesive coating. In using the decalcomanias of the present invention, they are merely held against the surface to which the design is to be transferred and then heat is applied, sufficient to somewhat slightly soften the design, effecting an incipient fusion of the design to the surface of the styrene plastic object, to which the decalcomania is to be applied. As a result, there is produced a styrene object, having the desired ornamental design thereon, the design being firmly bonded.

We have, in other examples of the invention, increased the amount of styrene plastic in the lacquer used to about 50%, in place of using the 18,000 molecular weight plastic we have used the low molecular weight plastics, such, for example, as a plastic having a molecular weight of 6,000. Generally, the molecular weight of the plastic will vary between 5,000 and 20,000.

While the particular example of the invention herein described is well-adapted for carrying out the objects of the invention, it is to be understood that various modifications and changes may be made and this invention includes all such modifications and changes as come within the scope of the appended claims.

We claim:

1. A lacquer comprising a polystyrene resin of a molecular weight of 5,000 to 20,000, a plasticizer, and isophorone and diethylene glycol monobutyl ether acetate.

2. A lacquer comprising a polystyrene resin of a molecular weight of 5,000 to 20,000, a plasticizer, and isophorone and diethylene glycol monobutyl ether acetate, and a pigment.

BERNARD J. CAGAN.
WALTER BURROUGHS.
ROBERT SILVERSTEIN.

REFERENCES CITED

The following references are of record in the file of this patent:

UNITED STATES PATENTS

| Number | Name | Date |
|---|---|---|
| 1,954,878 | Lawrence | Apr. 17, 1934 |
| 2,067,435 | Chatfield et al. | Jan. 12, 1937 |
| 2,128,672 | Gessler | Aug. 30, 1938 |
| 2,264,625 | Doolittle | Dec. 2, 1941 |
| 2,287,348 | Hayden | June 23, 1942 |
| 2,321,897 | Britton et al. | June 15, 1943 |
| 2,349,136 | Britton et al. | Mar. 16, 1944 |
| 2,375,701 | Smith | May 8, 1945 |

OTHER REFERENCES

Mason and Manning: The Technology of Plastics and Resins, p. 100, published by D. Van Nostrand Co., Inc., New York, N. Y., 1945.